No. 894,196. PATENTED JULY 28, 1908.
E. F. DOLLAR.
FISH TRAP.
APPLICATION FILED JULY 13, 1907.
2 SHEETS—SHEET 1.
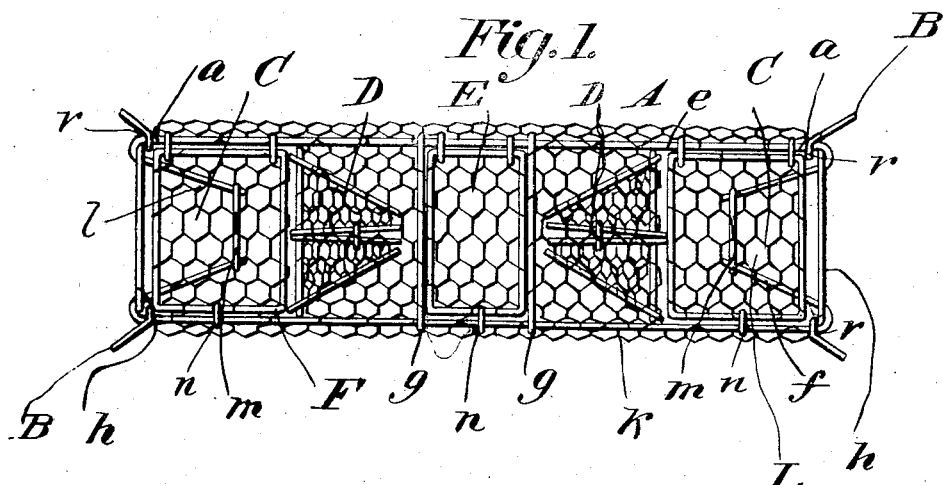
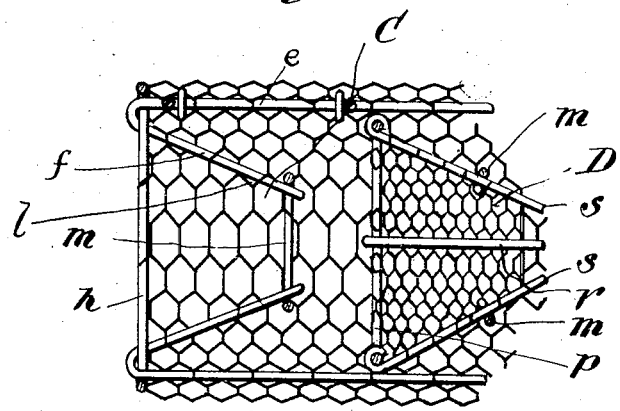
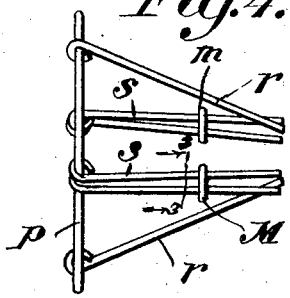
Witnesses
Phil E. Barnes
J. J. Sheehy Jr.
Inventor
Edward F. Dollar,
By James J. Sheehy
Attorney

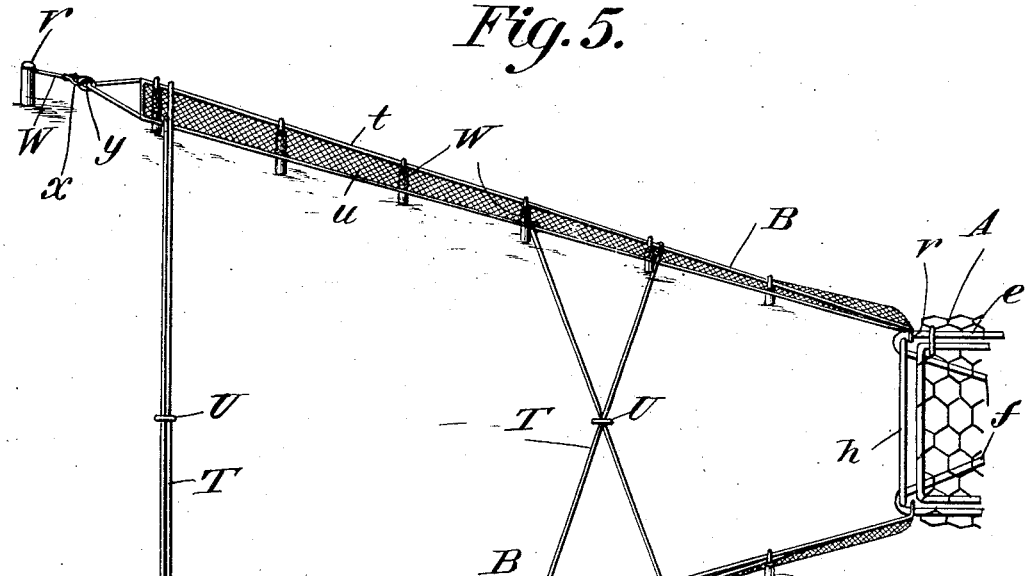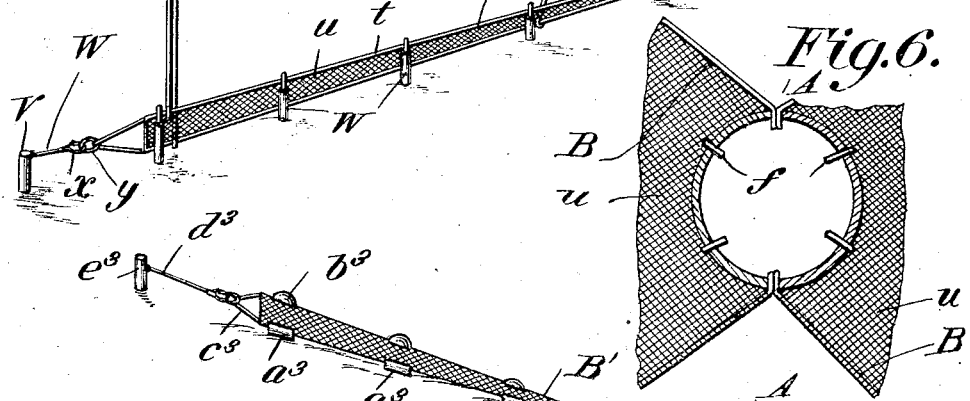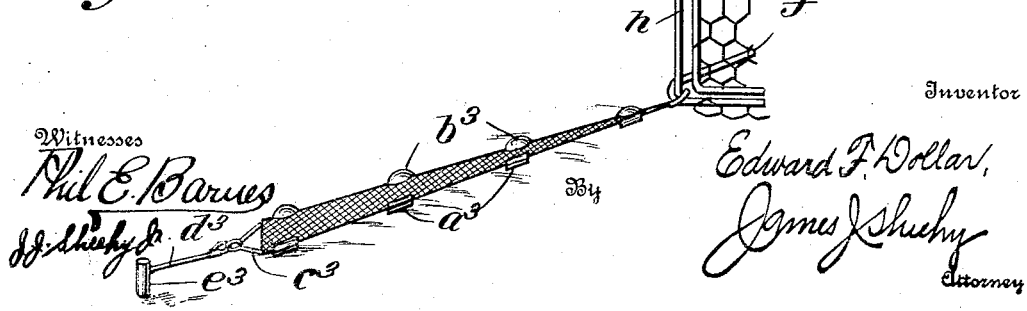

UNITED STATES PATENT OFFICE.

EDWARD F. DOLLAR, OF PELHAM, GEORGIA.

FISH-TRAP.

No. 894,196.

Specification of Letters Patent.

Patented July 28, 1908.

Application filed July 13, 1907. Serial No. 383,711.

*To all whom it may concern:*

Be it known that I, EDWARD F. DOLLAR, citizen of the United States, residing at Pelham, in the county of Grady and State of Georgia, have invented new and useful Improvements in Fish-Traps, of which the following is a specification.

My invention relates to fish traps; and it has for one of its objects to provide in a fish trap a peculiar and advantageous cage or pound for segregating small fish from large fish with a view of preventing the latter devouring the former before they can be taken from the cage or pound.

Another object of the invention is the provision in combination with the cage or pound of a fish trap; of advantageous deflectors for directing or guiding fish to the cage or pound.

With the foregoing in mind, the invention will be fully understood from the following description and claims when the same are read in connection with the drawings accompanying and forming part of this specification, in which:

Figure 1 is a plan view of the trap constituting the preferred embodiment of my invention. Fig. 2 is an enlarged diametrical section showing one end portion of the novel cage or pound. Fig. 3 is an enlarged detail section taken in the plane indicated by the line 3—3 of Fig. 4, and showing one of the slides for regulating the size of the inner ends of the inwardly-contracted entrances of the cage or pound. Fig. 4 is a detail side elevation showing a portion of the frame of one of said entrances. Fig. 5 is an enlarged detail plan view illustrative of the deflectors at one end of the cage or pound. Fig. 6 is a cross-section showing the arrangement of said deflectors relative to one end of the trap. Fig. 7 is a plan view of modified deflectors.

Referring by letter to the said drawings, and more particularly to Figs. 1 to 5 thereof, A is the cage or pound of my novel trap, and B B are deflectors which are designed to guide fish to the entrances of the cage or pound.

As shown in Fig. 1, the cage or pound A comprises a body having inwardly-contracted entrances C at its ends and inwardly-contracted entrances D at points intermediate its middle and the said entrances C, a hinged door E for the compartment between the inner contracted entrances D, and hinged doors F for the end compartments—*i. e.*, the compartments between the outer contracted entrances C and the inner contracted entrances D. The eduction ends of the inner contracted entrances D are smaller in transverse area than the corresponding ends of the outer contracted entrances C in about the proportion illustrated, and consequently it will be manifest that while small fish and large fish can gain access to the compartments between the two pairs of entrances C and D, only small fish can pass through the entrances D and into the middle compartment—that is, the compartment between the entrances D. In other words when both large and small fish are trapped in the outer compartments, the small fish alone can pass to the inner or middle compartment, and in that way the small fish can avoid being devoured by the large fish to the profit of the party operating the trap.

The body of the cage or pound A is made up of longitudinal wires $e$, arranged a suitable distance apart and having inturned inwardly-converging portions $f$ at their opposite ends, circular wires or rings $g$ arranged adjacent to the middle of the body and suitably connected to the longitudinal wires $e$, circular wires or rings $h$ arranged at the ends of the body and suitably connected with the longitudinal wires $e$, and wire netting $k$. The wire netting $k$ receives in its interstices the longitudinal wires $e$ and circular wires or rings $g$ and $h$, whereby it is securely connected thereto, and it is provided at the ends of its main portion with inwardly bent and contracted portions $l$ which receive in their interstices the inwardly-converging portions $f$ of the longitudinal wires $e$, whereby they are secured to said portions $f$. They are also attached at their ends to rings $m$ on the wire portions $f$. The body constructed as just described is inexpensive and easy to manufacture and at the same time is strong and durable; and it will also be noted that the wire portions $f$ and the inturned portions $l$ of wire-netting form the before mentioned outer entrances C.

When my novel trap is in use, the doors E and F are held in closed positions through catches $n$ or other suitable means.

The inner contracted entrances D of the cage or pound A are formed in the manner illustrated in Figs. 1 to 4—*i. e.*, they respectively comprise an outer ring or circular wire $p$ suitably connected to the body of the cage or pound, diametrically opposite, inwardly-converged wires $r$ fixedly connected at their outer ends to the ring $p$, two opposite pairs of inwardly-converged wires $s$ fixedly connected at their outer ends to the ring $p$ and arranged about midway between the wires $r$, and wire netting $s$ connected at one end to the ring $p$ and surrounding and receiving in its interstices the wires $r$ and $s$, whereby it is connected of itself to said wires $r$ and $s$. The wires $s$ of each pair are connected quite close together to the ring $p$ and consequently the opposite ends of the wires have a tendency to spring apart and in that way enlarge the eduction end of the entrance. In order that the said eduction end of the entrance may be reduced as occasion demands, I provide the adjusting slides M, one for each pair of wires $s$. These slides M clasp the wires $s$ of a pair, as best shown in Figs. 3 and 4, and hence it will be apparent that when the slides are moved inward the eduction end of the entrance will be reduced in size, while when said slides are moved outward, the free ends of the wires $s$ will by springing outward enlarge the said eduction end of the entrance. In this way it will be apparent that the entrances D may be readily adapted for the kind of fish to be caught. But a slight movement of the slides M is necessary in order to accomplish the contraction or expansion of the eduction ends of the entrance C, and consequently it will be understood that the passing of the wires $s$ through the interstices of the wire netting will not interfere with the necessary adjustment of the said slides M.

The deflectors which I prefer to employ are illustrated in Figs. 1, 5 and 6, and as the deflectors at the opposite ends of the cage or pound are identical in construction, a detailed description of those shown in Figs. 5 and 6 will suffice to impart a definite understanding of all. The deflectors B may be of any desired shape in cross-section, may be made of any suitable material, and may be connected with the cage or pound A in any approved manner without involving departure from the scope of my claimed invention. I prefer, however, to shape the deflectors in cross-section as shown in Fig. 6, to have them respectively comprise a wire frame $t$ and reticulated material $u$, to increase them in width as they recede from the cage or pound, and to detachably connect them to the cage or pound A through the medium of hooks $v$ which engage longitudinal wires of the cage or pound, as shown in Fig. 1. From this it follows that when deemed expedient the cage or pound A may be used without the deflectors or guides B.

As it is essential for the deflectors B to extend a considerable distance from the cage or pound A, I provide each deflector at intervals of its length with stakes $w$ which are connected to the top bar of the deflector, preferably in a detachable manner, and are driven into the bottom of the body of water. I also provide between the deflectors pairs of braces T. These braces may be rods, wires, bars of wood or other material, and one brace of each pair extends from the top of one deflector to the bottom of the other. At their point of intersection the braces of a pair are connected together in any suitable manner; the wire braces T shown being preferably connected by a surrounding ring U. I have shown two pairs of braces properly arranged relative to the deflectors B, but it its obvious that any desired numbers of pairs may be employed in the discretion of the party practicing the invention. The stakes $w$ serve to fix both the deflectors B and the cage or pound A in position, but when necessary to resist the action of a strong current or tide, posts V may be driven into the bottom of the body of water, and to said posts V cables W may be connected; said cables having snap hooks $x$ at their ends remote from the posts. These hooks are engaged with rings $y$ on ropes extending to the upper and lower bars of the deflectors B, and hence it will be seen that the deflectors may be strongly connected with the posts V, and yet when desired the deflectors may be readily disconnected from the posts.

In Fig. 7, I have shown in plan modified deflectors B' in the form of nets. These net deflectors are connected to the end of the cage or pound A in the detachable manner illustrated or any other preferred manner, and are provided at intervals along their lower edges with sinkers $a^3$, and at intervals along their upper edges with floats $b^3$. At its outer end each deflector has a loop $c^3$, and these loops are connected through cables $d^3$ with posts $e^3$ driven into the bottom of the body of water.

In the practical use of my improved trap, a basket of bait (not shown) is suspended in the middle compartment of the cage or pound A, and the trap as a whole is secured in a body of water. When the trap is thus arranged, fish will be guided by the deflectors to the cage or pound and will pass through the contracted entrances of the latter to get at the bait, and hence will be caught and retained in the cage or pound; the large fish in the outer compartments and the little fish in the middle compartment where they are protected from the large fish.

The construction herein shown and described constitutes the preferred embodiment of my invention, but it is obvious that in practice such changes or modifications may be made as fairly fall within the scope of my invention as defined in the claims appended. For instance instead of using wire netting in the cage or pound, netting of cord or other suitable material may be employed without affecting my invention.

Having described my invention, what I claim and desire to secure by Letters-Patent, is:

1. In a fish trap, cage or pound, the combination of a body having compartments and separate doors therefor, an inwardly-contracted entrance in one end of the body, and an inner entrance arranged in the body and having an eduction end smaller in size than the corresponding end of the first mentioned entrance; the said inner entrance comprising a ring fixed to the body, wires fixed to and extending longitudinally and inwardly from the ring and arranged so that their free ends tend to spring apart, slides clasping and adjustable on the wires in the direction of the length thereof, and netting connected to the ring and wires.

2. In a fish trap, the combination with a cage or pound; of deflectors connected with and diverging from one end of the cage or pound, stakes connected to the tops of the deflectors at intervals in the length thereof and adapted to be secured in the bottom of a body of water, and crossed braces extending between and connected to the deflectors and also connected together at their point of intersection.

3. In a fish trap, the combination with a cage or pound; of deflectors connected with and diverging from one end of the cage or pound, stakes detachably connected to the tops of the deflectors at intervals in the length thereof and adapted to be secured in the bottom of a body of water, pairs of crossed braces extending between and connected to the deflectors at intervals in the length thereof and also connected together at their points of intersection, and posts adapted to be driven into the bottom of a body of water and having cables connected thereto and provided with means whereby they may be detachably connected with the ends of the deflectors.

In testimony whereof I have hereunto set my hand in presence of two subscribing witnesses.

EDWARD F. DOLLAR.

Witnesses:
J. S. WEATHERS,
W. T. CRAWFORD.